United States Patent [19]

Hari et al.

[11] 4,081,439
[45] Mar. 28, 1978

[54] AROMATIC DISAZO PIGMENTS

[75] Inventors: Stefan Hari, Allschwil; Karl Ronco, Riehen, both of Switzerland

[73] Assignee: Ciba-Geigy Corporation, Ardsley, N.Y.

[21] Appl. No.: 717,784

[22] Filed: Aug. 25, 1976

Related U.S. Application Data

[63] Continuation-in-part of Ser. No. 479,964, Jun. 17, 1974, abandoned.

[30] Foreign Application Priority Data

Jun. 22, 1973  Switzerland ............... 9183/73

[51] Int. Cl.² .................................. C09B 33/14
[52] U.S. Cl. ................. 260/176; 260/208; 106/288 Q
[58] Field of Search ............................ 260/176

[56] References Cited

U.S. PATENT DOCUMENTS 2,591,470  4/1952  Schmid et al. ............... 260/176

FOREIGN PATENT DOCUMENTS 2,243,999  3/1973  Germany ............... 260/176
2,243,955  3/1973  Germany ............... 260/176

Primary Examiner—Charles F. Warren
Attorney, Agent, or Firm—Vincent J. Cavalieri

[57] ABSTRACT

Disazo pigments of the formula

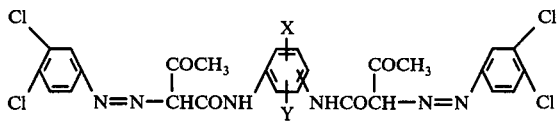

wherein X and Y denote hydrogen or halogen atoms, alkyl or alkoxy groups containing 1-6 carbon atoms, or aryloxy, trifluoromethyl, nitro, cyano or carboxylic acid ester groups, or wherein X and Y conjointly denote a fused benzene ring are useful for coloring plastics, lacquers and printing inks in yellow shades.

1 Claim, No Drawings

AROMATIC DISAZO PIGMENTS

This is a continuation-in-part of our copending application Ser. No. 479,964 filed June 17, 1974, now abandoned.

It has been found that new, valuable disazo pigments of the formula

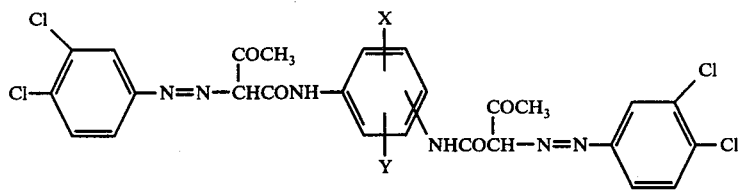

are obtained, wherein X and Y denote hydrogen or halogen atoms, alkyl or alkoxy groups containing 1–6 carbon atoms, or aryloxy, trifluoromethyl, nitro, cyano or carboxylic acid ester groups, or wherein X and Y conjointly denote a fused benzene ring.

Disazo pigments of particular interest are those of the formula

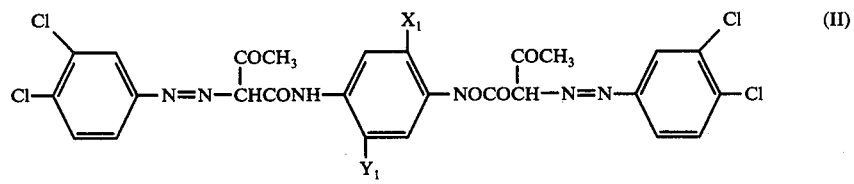

wherein $X_1$ and $Y_1$ denote hydrogen or chlorine atoms, or alkyl or alkoxy groups containing 1–4 carbon atoms.

Particularly preferred pigments are those of the formula II wherein $X_1$ denotes a chlorine atom and $Y_1$ denotes a chlorine atom, a methyl or a methoxy group.

The coupling components preferably correspond to the formula

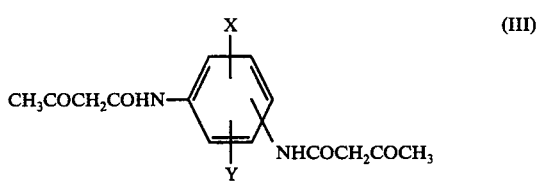

wherein X and Y have the meaning indicated above, and particularly correspond to the formula

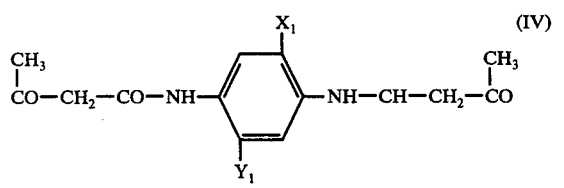

wherein $X_1$ and $Y_1$ have the meaning indicated above.

Compounds of particular interest are those of the formula IV wherein $X_1$ denotes a chlorine atom and $Y_1$ denotes a chlorine atom, a methyl group or a methoxy group.

The coupling components are obtained in a simple manner by the action of diketene or acetoacetic ester on the corresponding diamines, such as, for example: 1,4-phenylenediamine, 2-chloro-1,4-phenylenediamine, 2-methyl-1,4-phenylenediamine, 2-methoxy-1,4-phenylenediamine, 2-ethoxy-1,4-phenylenediamine, 2-propoxy-1,4-phenylenediamine, 2-isopropoxy-1,4-pheneylenediamine, 2-butoxy-1,4-phenylenediamine, 2-nitro-1,4-phenylenediamine, 2-cyano-1,4-phenylenediamine, 2-methoxycarbonyl-1,4-phenylenediamine, 2-ethoxy-carbonyl-1,4-phenylenediamine, 2-trifluoromethyl-1,4-phenylenediamine, 2,5-dichloro-1,4-phenylenediamine, 2,5-dibromo-1,4-phenylenediamine, 2,5-dimethyl-1,4-phenylenediamine, 2,5-dimethoxy-1,4-phenylenediamine, 2,5-diethoxy-1,4-phenylenediamine, 2-methoxy-5-ethoxy-1,4-phenylenediamine, 2-methoxy-5-propoxy-1,4-phenylenediamine, 2,5-dipropoxy-1,4-phenylenediamine, 2,5-bis-trifluoromethyl-1,4-phenylenediamine,2-chloro-5-methyl-1,4-phenylenediamine, 2-chloro-5-methoxy-1,4-phenylenediamine, 2-chloro-5-ethoxy-1,4-phenylenediamine, 2-methyl-5-methoxy-1,4-phenylenediamine, 2-methyl-5-ethoxy-1,4-phenylenediamine, 2,6-dichloro-1,4-phenylenediamine, 2,3,6-trichloro-1,4-phenylenediamine, 2,3,5,6-tetrachloro-1,4-phenylenediamine, 2,3,5,6-tetramethyl-1,4-phenylenediamine, 1,3-phenylenediamine, 4-chloro-1,3-phenylenediamine, 4-methyl-1,3-phenylenediamine, 4-methoxy-1,3-phenylenediamine, 2,5-dichloro-1,3-phenylenediamine, 4,6-dichloro-1,3-phenylenediamine, 4,6-dimethyl-1,3-phenylenediamine and 1,5-naphthylenediamine.

The coupling preferably takes place in a weakly acid medium, appropriately in the presence of customary agents which promote the coupling. Examples of these which should be particularly mentioned are dispersing agents, for example aralkylsulphonates, such as dodecylbenzenesulphonate, or 1,1'-dinaphthylmethane-2,2'-disulphonic acid or polycondensation products of alkylene oxides. The dispersion of the coupling component can also advantageously contain protective colloids, for example methyl cellulose or minor amounts of inert organic solvents which are sparingly soluble or insoluble in water, for example, if appropriate, halogenated or nitrated aromatic hydrocarbons, such as benzene, toluene, xylene, chlorobenzene, dichlorobenzene or nitrobenzene, and aliphatic halogenated hydrocarbons, such as, for example, carbon tetrachloride or trichloroethylene and also water-miscible organic solvents, such acetone, methyl ethyl ketone, methanol, ethanol or isopropanol.

The coupling can also be advantageously carried out by combining an acid solution of the diazonium salt with an alkaline solution of the coupling component continuously in a mixing jet, an immediate coupling of the components taking place. Care must be taken that the diazo component and the coupling component are present in the mixing jet in equimolecular amounts, and it is advantageous to use a slight excess of the diazo component. This is achieved most simply by controlling the pH value of the liquid in the mixing jet. A high degree of turbulence of the two solutions in the mixing jet must also be ensured. The resulting dispersion of dyestuff is withdrawn continuously from the mixing jet and the dyestuff is separated by filtration.

By virtue of their insolubility, the resulting pigments can be isolated from the reaction mixtures by filtering. It proves advantageous to after-treat the resulting pigments with an organic solvent, preferably one boiling above 100° C. The following prove particularly suitable: benzenes substituted by halogen atoms or alkyl or nitro groups, such as xylenes, chlorobenzene, o-dichlorobenzene or nitrobenzene, and pyridine bases, such as pyridine, picoline or quinoline, and also ketones, such as cyclohexanone, ethers, such as ethylene glycol monomethyl or monoethyl ether, amides, such as dimethylformamide, or n-methylpyrrolidone.

The after-treatment is preferably carried out by heating the pigment in the solvent to 100° – 150° C, a coarsening of particle size occurring in many cases, which has a favourable influence on the fastness to light and to migration of the resulting pigments.

The coupling can also be carried out by heating a diazoamino compound of the amine to be used as the diazo component with the diacetoacetylarylenediamine in an organic solvent, if appropriate in an aqueous-organic solvent, preferably in the presence of an acid.

The diazoamino compounds to be used in accordance with the invention are obtained by known processes by coupling a diazonium salt of the amine acting as the diazo component, with a primary, or preferably a secondary, amine.

The most diverse amines are suitable for this purpose, for example aliphatic amines, such as methylamine, ethylamine, ethanolamine, propylamine, butylamine, hexylamine and especially dimethylamine, diethylamine, diethanolamine, methylethanolamine, dipropylamine or dibutylamine, aminoacetic acid, methylaminoacetic acid, butylaminoacetic acid, aminoethanesulphonic acid, methylaminoethanesulphonic acid, guanylethanesulphonic acid, β-aminoethylsulphuric acid, aliphatic amines, such as cyclohexylamine, N-methylcyclohexylamine and dicyclohexylamine and aromatic amines, such as 4-aminobenzoic acid, sulphanilic acid, 4-sulpho-2-aminobenzoic acid, (4-sulphophenyl)-guanidine, 4-N-methylaminobenzoic acid, 4-ethylaminobenzoic acid, 1-aminonaphthalenesulphonic acid and 1-aminonaphthalene-2,4-disulphonic acid, and heterocyclic amines, such as piperidine, morpholine, pyrrolidine and dihydroindole, and finally also sodium cyanamide or dicyandiamide.

As a rule the resulting diazoamino compounds are sparingly soluble in cold water and can be separated in a crystallised form from the reaction medium, if appropriate after salting out. In many cases the moist press cakes can be used for the further reaction. In individual cases it can prove advisable to free the diazo amides from water by vacuum drying before the reaction or, after suspending the moist press cake in a solvent, to remove the water by azeotropic distillation.

The coupling of the diazoamino compound with the naphthol is carried out in an organic solvent, for example chlorobenzene, o-dichlorobenzene, nitrobenzene, pyridine, ethylene glycol, ethylene glycol monomethyl ether or monoethyl ether, dimethylformamide, N-methylpyrrolidine, formic acid or acetic acid. In using solvents, which are miscible wih water it is not necessary to use the diazoamino compound in an anhydrous form. For example, the filter cakes, moist with water, can be used. The splitting of the diazoamino compound which precedes the coupling is carried out in an acid medium. If neutral solvents are used, it is necessary to add an acid, for example hydrochloric acid, sulphuric acid, formic acid, acetic acid, chloroacetic acid or propionic acid.

The coupling is suitably carried out hot, preferably at temperatures between 80° and 180° C and in general it proceeds very rapidly and completely.

Finally, the coupling can also be accomplished by suspending the amine to be diazotised in an organic solvent with the coupling component in the molar ratio of 2:1 and treating the mixture with a diazotising agent, especially an ester of nitrous acid, such as methyl nitrite, ethyl nitrite, butyl nitrite, amyl nitrite or octyl nitrite.

The new dyestuffs represent valuable pigments, which can be used in a finely divided form for pigmenting high molecular organic material, for example cellulose ethers and esters, high molecular polyamides or high molecular polyurethanes or polyesters, acetylcellulose, nitrocellulose, natural resins or synthetic resins, such as polymerisation resins or condensation resins, for example aminoplasts, especially urea formaldehyde and melamine formaldehyde resins, alkyd resins and phenoplasts, polycarbonates, polyolefines, such as polystyrene, polyvinyl chloride, polyethylene, polypropylene, polyacrylonitrile and polyacrylic acid esters, rubber, casein, silicone and silicone resins, individually or as mixtures.

In this it is immaterial whether the high molecular compounds mentioned are present as plastic compositions or melts or in the form of spinning solutions, lacquers, paints or printing inks. Depending on the application, it is found to be advisable to use the new pigments as toners or in the form of preparations.

In addition to the pure pigment, the preparations can contain, for example, natural resins, for example abietic acid or esters thereof, ethylcellulose, cellulose acetobutyrate, alkaline earth metal salts of higher fatty acids, fatty amines, for example stearylamine or rosin-amine, vinyl chloride-vinylacetate copolymers, polyacrylonitrile or polyterpene resins or water-soluble dyestuffs, for example dyestuff sulphonic acids or alkaline earth metal salts thereof.

The dyestuffs according to the invention are distinguished by low cost, by good fastness to light, migration and weathering, great colour strength, good dispersibility, brilliance, and strong resistance to alkali and heat. Compared with known disazo pigments which are obtained by coupling isomeric dichloroanilines with bisacetoacetyl-arylenediamines, they are distinguished by their excellent fastness to weathering and to light and by their good dispersibility.

In the following Examples, unless otherwise indicated, the parts denote parts by weight and the percentages denote percentages by weight.

EXAMPLE 1

4.9 parts of 3,4-dichloroaniline in 40 parts by volume of glacial acetic acid are stirred with 8 parts by volume of concentrated hydrochloric acid, the hydrochloride of the base being formed. The mixture is then cooled to 5° C by the addition of 50 parts of ice and is diazotised by the addition of 8 parts by volume of 4.4N sodium nitrite. The yellow diazo solution is stirred at 0° to 5° C, until only traces of nitrous acid are still detectable. The diazo solution is then filtered to give a clear solution by the addition of a little decolourising charcoal. The filtrate is brought to pH 4 by the addition of 15 parts of anhydrous crystalline sodium acetate.

At the same time, 5 parts of 98% strength 2-methyl-5-chloro-1,4-bisacetoacetylaminobenzene are dissolved in 40 parts of water with 7.5 parts by volume of 30% strength sodium hydroxide solution and 5 parts of n-butylsulphoricinoleate are added. This solution is then filtered with 0.5 part of decolourising charcoal to give a clear solution and is then added dropwise with good stirring to the diazo solution over the course of ½ hour. In the course thereof the temperature of the reaction mixture rises to 15° – 20° C. When the dropwise addition is complete, no further diazo compound can be detected in the mixture. The mixture is stirred for 1 hour at room temperature and then heated over the course of 1 hour to 80° – 85° C and filtered hot and the precipitate is washed free from salt with hot water. After drying at 95° to 100° C in vacuo, 9.9 parts (100% of theory) are obtained of a yellow dyestuuff of the formula

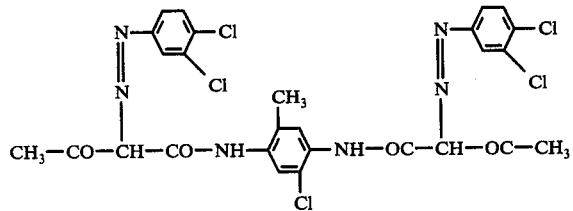

The pigment thus obtained is stirred for 1½ hours at 140° to 145° C in 150 parts by volume of o-dichlorobenzene. In the course thereof the dyestuff assumes a uniformly crystalline form. Fine yellow flakes can be seen under the microscope. The product is filtered at 100° C and washed with o-dichlorobenzene at 100° C until the filtrate comes through pale yellow, and the o-dichlorobenzene is then displaced by washing with methanol until the latter comes through colourless and the precipitate is finally washed with hot water. After drying, 8.3 parts of a brilliant yellow pigment dyestuff are obtained. It dyes plastics such as PVC in greenish-tinged yellow shades with excellent fastness to migration, light and weathering. The treatment in the organic solvent can also be carried out with the moist filter cake direct, without previous drying. Thus, it is possible to stir the moist press cake in picoline at 100° to 120° C, to filter and to wash with methanol and then with dilute hydrochloric acid, or to stir the moist press cake in chlorobenzene, dimethylformamide or nitrobenzene and to free it from water by azeotropic distillation and then to process it as described above.

The table which follows describes further dyestuffs which are obtained by coupling the diazotised 3,4-dichloroaniline with the bisacetoaceticarylides of the diamines of Column I. Column II gives the colour shade of PVC sheet dyed with 0.2% of these pigments.

| Ex. No. | I | II |
|---|---|---|
| 2 | 1,4-phenylenediamine | pale yellow |
| 3 | 2-chloro-1,4-phenylenediamine | yellow |
| 4 | 2-bromo-1,4-phenylenediamine | yellow |
| 5 | 2-trifluoromethyl-1,4-phenylenediamine | greenish-tinged yellow |
| 6 | 2-cyano-1,4-phenylenediamine | greenish-tinged yellow |
| 7 | 2-nitro-1,4-phenylenediamine | greenish-tinged yellow |
| 8 | 2-methyl-1,4-phenylenediamine | yellow |
| 9 | 2-methoxy-1,4-phenylenediamine | yellow |
| 10 | 2-ethoxy-1,4-phenylenediamine | orange |
| 11 | 2,5-dichloro-1,4-phenylenediamine | yellow |
| 12 | 2,3-dichloro-1,4-phenylenediamine | yellow |
| 13 | 2,6-dichloro-1,4-phenylenediamine | yellow |
| 14 | 2,5-dibromo-1,4-phenylenediamine | yellow |
| 15 | 2,5-bis-trifluoromethyl-1,4-phenylenediamine | yellow |
| 16 | 2-chloro-5-methoxy-1,4-phenylenediamine | yellow |
| 17 | 2-chloro-5-ethoxy-1,4-phenylenediamine | yellow |
| 18 | 2,5-dimethyl-1,4-phenylenediamine | yellow |
| 19 | 2-methoxy-5-methyl-1,4-phenylenediamine | yellow |
| 20 | 2,5-dimethoxy-1,4-phenylenediamine | orange |
| 21 | 2,5-diethoxy-1,4-phenylenediamine | orange |
| 22 | 2,5-dipropoxy-1,4-phenylenediamine | orange |
| 23 | 2-methoxy-5-ethoxy-1,4-phenylenediamine | orange |
| 24 | 2-methoxy-5-propoxy-1,4-phenylenediamine | orange |
| 25 | 2,3,6-trichloro-1,4-phenylenediamine | yellow |
| 26 | 2,3,5,6-tetrachloro-1,4-phenylenediamine | yellow |
| 27 | 2,3,5,6-tetramethyl-1,4-phenylenediamine | yellow |
| 28 | 1,3-phenylenediamine | yellow |
| 29 | 4-chloro-1,3-phenylenediamine | yellow |
| 30 | 4-methyl-1,3-phenylenediamine | yellow |
| 31 | 4-methoxy-1,3-phenylenediamine | yellow |
| 32 | 4,6-dichloro-1,3-phenylenediamine | yellow |
| 33 | 4,6-dimethyl-1,3-phenylenediamine | yellow |
| 34 | 2,5-dichloro-1,3-phenylenediamine | yellow |
| 35 | benzidine | yellow |
| 36 | 3,3'-dimethylbenzidine | yellow |
| 37 | 3,3'-dichlorobenzidine | yellow |
| 38 | 3,3-dimethoxybenzidine | orange yellow |

EXAMPLE 39

4.9 parts of 3,4-dichloroaniline are diazotised as described in Example 1. 4.9 parts of 1,5-bisacetoacetylaminonaphthalene are then dissolved in 40 parts by volume of water warmed to 50° C and 7.5 parts by volume of 30% strength aqueous sodium hydroxide solution. After adding 2 parts of kieselguhr, the resulting suspension is filtered to give a clear solution and the residue is rinsed with 60 parts by volume of water. The diazo solution is added dropwise to the clear, pale yellow solution thus obtained at 5° C and over the course of 20 minutes. In the course thereof a yellow precipitate is formed. The pH value of the resulting suspension is adjusted to 5 by the addition of 30 parts by volume of 30% strength aqueous sodium hydroxide solution and the suspension is stirred for one hour at a temperature which rises to 20° C, heated to 75° C in the course of a further hour and filtered hot with suction. The residue is washed free from salt and is dried in vacuo at 60° C. 9.8 parts, corresponding to 98% of theory, are obtained of a yellow pigment dyestuff of the formula

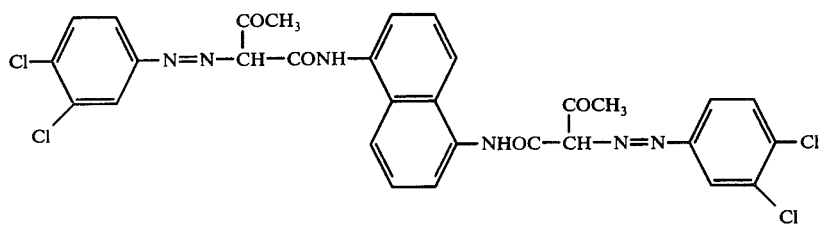

By means of after-treatment in o-dichlorobenzene (1 hour at 160° C), fast, yellow dyeings are obtained with this pigment, applied to polyvinyl chloride by rolling.

The 1,5-bisacetoacetylaminonapthalene can be prepared as follows:

31.6 Parts of 1,5-naphthylenediamine are stirred in 260 parts by volume of glacial acetic acid and 34 parts of diketene are then run in at 40° C with vigorous stirring. In the course thereof the temperature rises to 96° C and the reaction product is precipitated as a dense precipitate from the solution which is first formed. The suspension is stirred for 1 hour at 96° C, allowed to cool to room temperature and filtered. The material on the filter is washed with 40% strength acetic acid and then with water. After drying, 57.5 parts (88% of theory) of a beige-coloured powder are obtained, melting point 228 to 230° C.

Analysis ($C_{18}H_{18}N_2OH$): calculated: C, 66.2%; H, 5.6%; N, 8.6%. found: C, 65.4%; H, 5.5%; N, 8.4%.

EXAMPLE 40

0.6 g of the pigment prepared according to Example 1 is mixed with 67 g of polyvinyl chloride, 33 g of dioctylphthalate, 2 g of dibutyltin dilaurate and 2g of titanium dioxide and the mixture is processed on a roll mill for 15 minutes at 160° C to give a thin sheet. The yellow dyeing thus produced is strongly coloured and fast to migration and light.

EXAMPLE 41

1.00 g of the pigment prepared according to Example 1 is finely ground on an Engelsmann grinding machine with 4.00 g of printer's varnish of the following composition:

29.4% of linseed oil - stand oil (300 poises),
67.2% of linseed oil - stand oil (20 poises),
2.1% of cobalt octoate (8Co) and
1,3% of lead octoate (24% Pb)

and is then printed on art printing paper with the aid of a block, by the letterpress process, using 1 g/m². A strong, pure, orane-tinged yellow colour shade with good transparency and good gloss is obtained. In three- or four-colour printing, very brilliant green colour shades can be produced by over-printing onto blue.

The pigment is also suitable for other printing processes, such as photogravure, offset printing and flexographic printing, in which it also gives very good results.

EXAMPLE 42

15 g of a collodion cotton containing 33% of butanol, 15 g of a phthalate resin modified with castor oil, 15 g of a 70% strength butanolic solution of a urea varnishing resin, 20 g of butyl acetate, 10 g of glycol monoethyl ether, 20 g of toluene and 5 g of alcohol are processed into a lacquer. This is then pigmented with 2 g of the dyestuff according to Example 1 and 2 g of titanium dioxide (rutile) and is ground. After spraying onto cardboard and drying the lacquer, a yellow coating with very good fastness to light, over-varnishing and weathering is obtained.

EXAMPLE 43

1 g of the dyestuff according to Example 1 and 5 g of titanium dioxide are added to 100 g of a stoving lacquer consisting of 58.5 g of a 60% strength solution of a coconutalkyd resin in xylene, 23 g of a 65% strength solution of a melamine varnishing resin in butanol, 17 g of xylene and 1.5 g of butanol. The mixture is ground for 48 hours in a ball mill and the lacquer thus pigmented is sprayed onto a cleaned metal surface. After stoving at 120° C, a reddish-tinged yellow dyeing with good fastness to light, over-varnishing and weathering is obtained.

We claim:

1. A compound of the formula

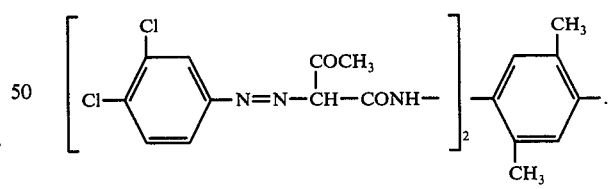

* * * * *